United States Patent
Park et al.

(10) Patent No.: US 10,607,776 B2
(45) Date of Patent: Mar. 31, 2020

(54) MULTILAYER CERAMIC ELECTRONIC COMPONENT

(71) Applicant: SAMSUNG ELECTRO-MECHANICS CO., LTD., Suwon-si, Gyeonggi-do (KR)

(72) Inventors: Kum Jin Park, Suwon-si (KR); Chang Hak Choi, Suwon-si (KR); Jong Hoon Yoo, Suwon-si (KR); Doo Young Kim, Suwon-si (KR); Min Gi Sin, Suwon-si (KR); Chi Hwa Lee, Suwon-si (KR); Chul Seung Lee, Suwon-si (KR); Jong Han Kim, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 105 days.

(21) Appl. No.: 15/071,803

(22) Filed: Mar. 16, 2016

(65) Prior Publication Data

US 2017/0025222 A1 Jan. 26, 2017

(30) Foreign Application Priority Data

Jul. 22, 2015 (KR) .................. 10-2015-0103745

(51) Int. Cl.
*H01G 4/12* (2006.01)
*H01G 4/30* (2006.01)
*H01G 4/008* (2006.01)

(52) U.S. Cl.
CPC ......... *H01G 4/1209* (2013.01); *H01G 4/0085* (2013.01); *H01G 4/30* (2013.01)

(58) Field of Classification Search
CPC .......... H01G 4/30; H01G 4/0085; H01G 4/12; H01G 4/1227; H01G 4/012; H01G 4/1209
See application file for complete search history.

(56) References Cited

U.S. PATENT DOCUMENTS 3,652,378 A * 3/1972 Mistler ............... B28B 1/16
428/446
3,886,254 A * 5/1975 Tanaka ............... C04B 35/111
264/125

(Continued)

FOREIGN PATENT DOCUMENTS

CN 103390496 A 11/2013
CN 103474237 A 12/2013

(Continued)

OTHER PUBLICATIONS

First Office Action issued in Chinese Patent Application No. 201610203178.5, dated May 24, 2018 (English translation).

(Continued)

*Primary Examiner* — David M Sinclair
(74) *Attorney, Agent, or Firm* — Morgan, Lewis & Bockius LLP (57) ABSTRACT

A multilayer ceramic electronic component includes a ceramic body in which dielectric layers and internal electrodes are alternately stacked. The dielectric layers contain at least one dielectric grain having a ratio of a long axis to a short axis that is 3.5 or more. The internal electrodes contain a ceramic component containing a grain growth adjusting ingredient for dielectric grains. Each dielectric layer includes interfacial portions adjacent to the internal electrodes and a central portion disposed between the interfacial portions, and concentrations of the grain growth adjusting ingredient in the interfacial portions and the central portion are different from each other.

22 Claims, 6 Drawing Sheets

(56) References Cited

U.S. PATENT DOCUMENTS

| | | | | |
|---|---|---|---|---|
| 4,143,207 A | * | 3/1979 | Itakura | C04B 35/47 252/520.21 |
| 5,166,859 A | * | 11/1992 | Ueno | C04B 35/47 156/89.16 |
| 5,183,631 A | * | 2/1993 | Kugimiya | B22F 1/02 419/10 |
| 6,205,014 B1 | * | 3/2001 | Inomata | H01G 4/30 361/312 |
| 2002/0075632 A1 | | 6/2002 | Nakano et al. | |
| 2006/0177678 A1 | * | 8/2006 | Iwanaga | C04B 35/4682 428/469 |
| 2006/0198078 A1 | * | 9/2006 | Miyauchi | H01G 4/008 361/305 |
| 2009/0201628 A1 | * | 8/2009 | Kagata | H01G 4/1209 361/321.4 |
| 2009/0219666 A1 | * | 9/2009 | Fukuda | C04B 35/4682 361/301.4 |
| 2009/0242099 A1 | * | 10/2009 | Nagaya | C04B 35/495 156/89.12 |
| 2011/0216472 A1 | * | 9/2011 | Nakamura | H01G 4/06 361/321.4 |
| 2012/0028018 A1 | * | 2/2012 | Cho | C03C 14/004 428/220 |
| 2012/0110807 A1 | * | 5/2012 | Kim | H01B 1/16 29/25.41 |
| 2012/0276372 A1 | * | 11/2012 | Lee | H01G 4/008 428/336 |
| 2013/0009515 A1 | * | 1/2013 | Kim | H01G 4/30 310/311 |
| 2013/0038983 A1 | * | 2/2013 | Kim | H01G 4/30 361/321.1 |
| 2013/0049532 A1 | * | 2/2013 | Kim | H01G 4/30 310/311 |
| 2013/0250478 A1 | * | 9/2013 | Kim | C04B 35/468 361/305 |
| 2013/0294008 A1 | | 11/2013 | Kim et al. | |
| 2013/0301185 A1 | | 11/2013 | Lee et al. | |
| 2013/0321978 A1 | | 12/2013 | Lee et al. | |
| 2015/0097650 A1 | * | 4/2015 | Shimura | H01C 7/008 338/22 SD |
| 2016/0329152 A1 | * | 11/2016 | Takeda | H01G 4/33 |

FOREIGN PATENT DOCUMENTS

| | | | | | |
|---|---|---|---|---|---|
| JP | 11103022 A | * | 4/1999 | | H01G 4/1209 |
| JP | 2002-305124 A | | 10/2002 | | |
| JP | 2003-124049 A | | 4/2003 | | |
| JP | 2004-311985 A | | 11/2004 | | |
| JP | 2009-260200 A | | 11/2009 | | |
| JP | 2009260200 A | * | 11/2009 | | |
| JP | 2010-67418 A | | 3/2010 | | |
| JP | 2010212503 A | * | 9/2010 | | |
| JP | 2011-210826 A | | 10/2011 | | |
| JP | 2013-236060 A | | 11/2013 | | |
| KR | 1999-0075846 A | | 10/1999 | | |

OTHER PUBLICATIONS

Office Action issued in corresponding Japanese Patent Application No. 2016-046820 dated Nov. 26, 2019, with English translation.

* cited by examiner

MULTILAYER CERAMIC ELECTRONIC COMPONENT

CROSS-REFERENCE TO RELATED APPLICATION

This application claims the priority and benefit of Korean Patent Application No. 10-2015-0103745, filed on Jul. 22, 2015 with the Korean Intellectual Property Office, the disclosure of which is incorporated herein by reference.

BACKGROUND

The present disclosure relates to a multilayer ceramic electronic component and a method of manufacturing the same.

Electronic components using a ceramic material, such as capacitors, inductors, piezoelectric elements, varistors, thermistors, or the like, include a ceramic body formed of ceramic material, internal electrodes formed in the ceramic body, and external electrodes mounted on a surface of the ceramic body so as to be connected to the internal electrodes.

Among such electronic components, a multilayer ceramic capacitor is generally manufactured by stacking a paste used for forming an internal electrode and a paste used for forming a dielectric layer using a sheet method, a printing method, or the like, and sintering the stacked pastes.

According to the related art, as a dielectric material used in the multilayer ceramic capacitor, or the like, a barium titanate ($BaTiO_3$) based dielectric material has been used.

As these electronic components are increasingly used in fields requiring high reliability, demand for high reliability multilayer ceramic electronic components has increased.

Meanwhile, in accordance with the development of a multilayer ceramic electronic component, the implementation of high capacitance and high reliability characteristics has emerged as an important problem to solve.

SUMMARY

An aspect of the present disclosure may provide a multilayer ceramic electronic component and a method of manufacturing the same.

According to an aspect of the present disclosure, a multilayer ceramic electronic component includes a ceramic body in which dielectric layers and internal electrodes are alternately stacked. The dielectric layers contain at least one dielectric grain having a ratio of a long axis to a short axis that is 3.5 or more. The internal electrodes contain a ceramic component containing a grain growth adjusting ingredient for dielectric grains. The dielectric layers are each composed of interfacial portions adjacent to the internal electrodes and a central portion disposed between the interfacial portions, and concentrations of the grain growth adjusting ingredient in the interfacial portions and the central portion are different from each other, and a method of manufacturing the same.

According to another aspect of the present disclosure, a multilayer ceramic electronic component includes a ceramic body in which dielectric layers and internal electrodes are alternately stacked. The dielectric layers contain at least one dielectric grain having a ratio of a long axis to a short axis that is 3.5 or more. The internal electrodes contain a grain growth adjusting ingredient for dielectric grains, which is one or more of a grain growth promoter and a grain growth inhibitor. The dielectric layers have a concentration gradient of the grain growth adjusting ingredient for dielectric grains in a thickness direction of the ceramic body.

According to a further aspect of the present disclosure, a multilayer ceramic electronic component includes a plurality of internal electrodes that are stacked parallel to each other, and a plurality of dielectric layers disposed between adjacent internal electrodes of the stacked internal electrodes. The internal electrodes and dielectric layers are stacked along a thickness direction of the multilayer ceramic electronic component, and each respective dielectric layer includes a grain growth adjusting ingredient, which is one or more of a grain growth promoter and a grain growth inhibitor, at a concentration that varies along the thickness direction in the respective dielectric layer.

Methods of manufacturing such multilayer ceramic electronic components are also provided.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term. "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship relative to one or more other element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the devices in the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, members, elements, and/or groups, but do not preclude the presence or addition of one or more other features, integers, steps, operations, members, elements, and/or groups.

Hereinafter, embodiments of the present inventive concept will be described with reference to schematic views illustrating embodiments of the present inventive concept. In the drawings, for example, ideal shapes of components are shown. However, due to manufacturing techniques and/or tolerances, components may be manufactured having modified shapes relative to those shown. Thus, embodiments of the present inventive concept should not be construed as being limited to the particular shapes of regions shown herein, but should more generally be interpreted as including changes in shape resulting from manufacturing processes and non-idealities. The inventive concepts may also be constituted by one or a combination of various embodiments shown and/or described herein.

The contents of the present inventive concept described below may have a variety of configurations. Only illustrative configurations are shown and described herein, and the inventive concepts are not limited thereto and should be interpreted as extending to all appropriate configurations.

Figure 1:
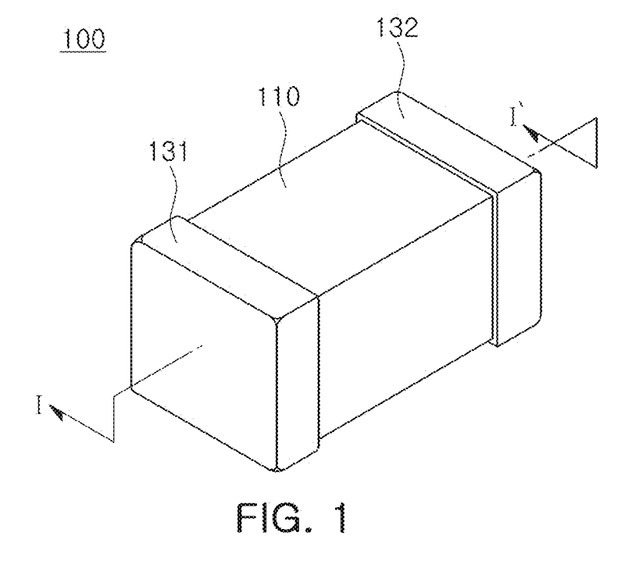
FIG. 1 is a perspective view illustrating a multilayer ceramic electronic component according to an exemplary embodiment.
Figure 2:
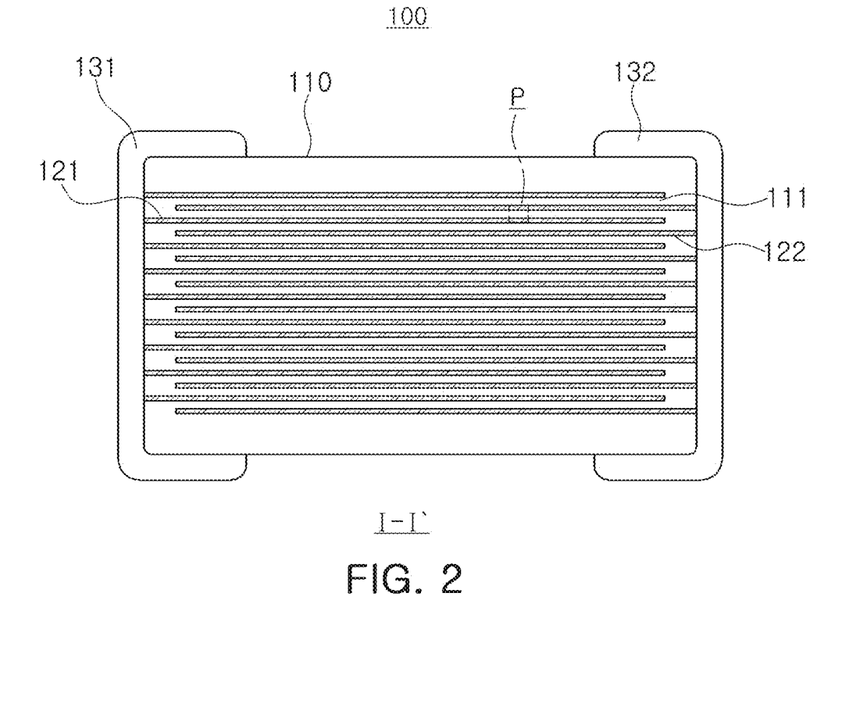
FIG. 2 is a cross-sectional view taken along line I-I' of FIG. 1.

FIG. 1 is a schematic perspective view illustrating a multilayer ceramic electronic component 100 according to an exemplary embodiment, and FIG. 2 is a schematic cross-sectional view of the multilayer ceramic electronic component 100 taken along line I-I' of FIG. 1.

Referring to FIGS. 1 and 2, the multilayer ceramic electronic component 100 according to the exemplary embodiment may include a ceramic body 110 and external electrodes 131 and 132 disposed on outer surfaces of the ceramic body.

The ceramic body 110 may include an active part defined as a portion contributing to forming capacitance of the electronic component and upper and lower cover layers formed on upper and lower surfaces of the active part as upper and lower margin parts, respectively. The active part may include dielectric layers 111 and the internal electrodes 121 and 122, and may be formed by stacking the dielectric layers 111 on which the internal electrodes 121 and 122 are printed. The upper and lower cover layers may include portions of the ceramic body 110 including dielectric layers 111 disposed above the uppermost internal electrode (121 or 122) and disposed below the lowermost internal electrode (121 or 122).

In the exemplary embodiment a shape of the ceramic body 110 is not particularly limited, but may substantially be a hexahedral shape. Note that a difference in thickness can be generated as a result of sintering shrinkage of a ceramic powder when an electronic component is sintered. The level of sintering shrinkage may vary according to the presence or absence of an internal electrode pattern. Further, edge portions of the ceramic body may be polished in such a manner that the ceramic body 110 does not have a perfect hexahedral shape. For at least these reasons, the ceramic body may have a shape substantially close to a hexahedral shape, although the ceramic body may not be shaped precisely according to a hexahedral shape.

The internal electrodes 121 and 122 may be alternately stacked with the dielectric layers 111 and electrically insulated from each other by the dielectric layer 111 interposed between the internal electrodes.

The internal electrodes 121 and 122 may include first and second internal electrodes 121 and 122, respectively, and the first and second internal electrodes may be alternately stacked on the dielectric layers.

A thickness and number of stacked internal electrodes 121 and 122 included in the ceramic body 110 may be determined depending on the use.

The internal electrodes 121 and 122 may contain nickel (Ni), copper (Cu), palladium (Pd), or alloys thereof, but are not limited thereto.

A conductive material contained in the first and second internal electrodes 121 and 122 is not particularly limited, but nickel (Ni) may be used.

The dielectric layer 111 may contain a ceramic composition having high permittivity. For example, the dielectric layer 111 may contain a barium titanate ($BaTiO_3$) based dielectric material.

The barium titanate ($BaTiO_3$) based dielectric material may be pure barium titanate or a compound in which other additional elements are doped in a Ba site (A site) and a Ti site (B site) of barium titanate.

Figure 3:
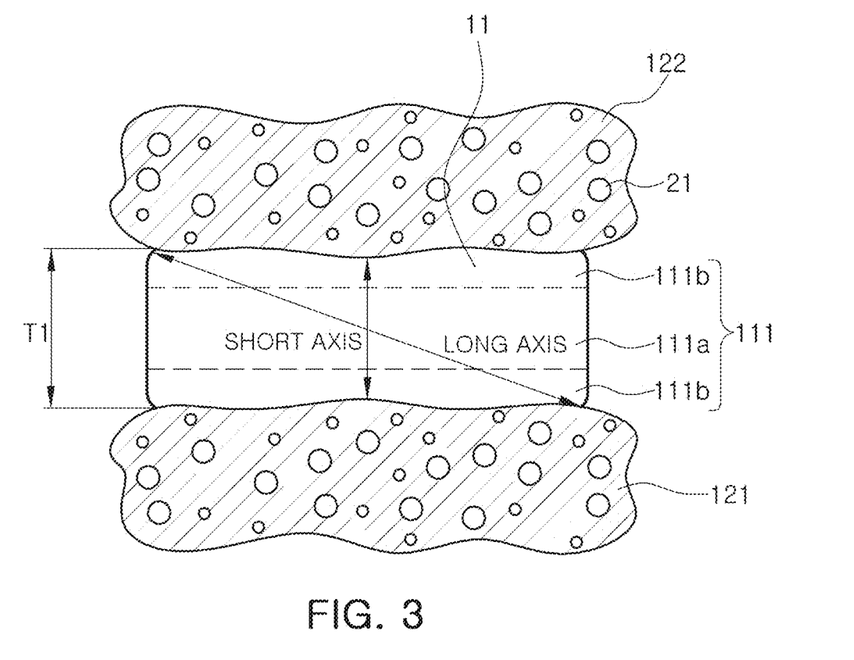
FIG. 3 is an enlarged view of part P of FIG. 2 according to a first exemplary embodiment.

FIG. 3 is an enlarged view of part P of FIG. 2 according to a first exemplary embodiment.

Referring to FIG. 3, in the multilayer ceramic electronic component according to the first exemplary embodiment, the dielectric layer 111 may contain at least one dielectric grain 11 of which a ratio of a long axis to a short axis is 3.5 or more.

As the multilayer ceramic electronic component, such as a multilayer ceramic capacitor, is micro-miniaturized and super-thinned, dimensions of layers of the component are on the same order of magnitude as dimensions of individual grains of materials forming those layers. In this regard, the dielectric material may be atomized such that a size of a dielectric grain in a dielectric layer can be decreased.

Therefore, in a multilayer ceramic capacitor according to the related art, in general, five or more dielectric grains are disposed in each of the dielectric layers in a thickness direction.

However, in a case in which a size of the dielectric grain in the dielectric layer is small, permittivity may be decreased. Therefore, in order to implement a super capacitance multilayer ceramic capacitor, the size of the dielectric grain is preferably increased, and in order to implement required properties, a shape of the dielectric grain is preferably controlled.

According to the first exemplary embodiment, since the dielectric layer 111 contains the at least one dielectric grain 11 of which the ratio of the long axis to the short axis is 3.5 or more, the size of the dielectric grain is large as compared to the related art, and the super capacitance multilayer ceramic capacitor may be implemented.

Further, unlike the related art, the number of dielectric grains 11 in the thickness direction in each of the dielectric layers 111 may be 1 or 2 to 5.

Particularly, only one dielectric grain 11 of which the ratio of the long axis to the short axis is 3.5 or more may be present in the thickness direction in each of the dielectric layers 111 as illustrated in FIG. 3.

That is, according to the exemplary embodiment, at least one dielectric grain 11 of which the ratio of the long axis to the short axis is 3.5 or more may be contained in a single dielectric layer 111, and in the case of this dielectric grain 11, only one dielectric grain 11 may be disposed in the thickness direction of the dielectric layer 111.

In the exemplary embodiment, the short axis and the long axis of the dielectric grain 11 may be defined as illustrated in FIG. 3.

That is, the long axis and the short axis of the dielectric grain 11 may be defined as a longest length and a shortest length measured within boundaries of the dielectric grain, respectively.

For example, as illustrated in FIG. 3, the longest length may be a length between both boundaries of the dielectric grain 11 in a diagonal direction, and the shortest length may be a length between boundaries thereof in the thickness direction of the dielectric layer.

Figure 7:
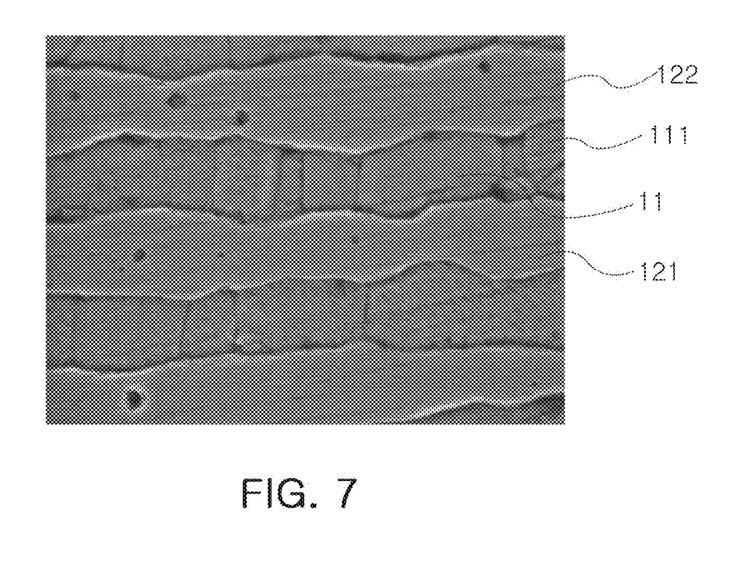
FIG. 7 is a scanning electron microscope (SEM) photograph obtained by cutting a multilayer body subjected to the sintering according to an exemplary embodiment.

The reason why the long axis and the short axis are defined as described above is that, unlike the related art, the shape of the dielectric grain 11 according the exemplary embodiment is substantially rectangular and has a width that is larger than a length. This shape may be confirmed from a scanning electron microscope (SEM) photograph obtained by observing a cross section of a dielectric layer, as illustrated in FIG. 7.

In a case in which at least one dielectric grain 11, having the ratio of the long axis to the short axis that is 3.5 or more, is contained in the single dielectric layer 111 as in the first exemplary embodiment, high permittivity may be obtained.

Therefore, the super capacitance multilayer ceramic capacitor may be implemented, and permittivity equal to two or more times that of dielectric grains formed in dielectric layers of a general multilayer ceramic capacitor according to the related art may be obtained.

More specifically, in the general multilayer ceramic capacitor in which five or more dielectric grains are disposed in each of the dielectric layers in the thickness direction, permittivity of about 3000 may be implemented, but according to the exemplary embodiment, permittivity of about 7000 may be implemented.

In an example in which there is no dielectric grain 11 of which the ratio of the long axis to the short axis is 3.5 or more in the single dielectric layer 111, that is, in a case in which the ratio of the long axis of the dielectric grain 11 present in the single dielectric layer 111 to the short axis thereof is less than 3.5, high permittivity as in the first exemplary embodiment may not be implemented.

Meanwhile, in an example in which the dielectric grain 11 of which the ratio of the long axis to the short axis is 3.5 or more is included in the single dielectric layer 111 as in the first exemplary embodiment, a problem such as insulation resistance degradation may occur.

However, this problem may be addressed by adjusting a concentration of a grain growth adjusting ingredient in interfacial portions of the dielectric layer 111 as described below, and a detailed description thereof will be described below.

Meanwhile, a method of controlling the shape of the dielectric grain so that at least one dielectric grain 11, having the ratio of the long axis to the short axis of 3.5 or more, is contained in the single dielectric layer 111 may be performed as follows.

The method may be performed by controlling the concentration of the grain growth adjusting ingredient according to a position of the dielectric layer. The method may include using a ceramic component, contained in the internal electrodes 121 and 122, that itself contains the grain growth adjusting ingredient for the dielectric grains. The grain growth adjusting ingredient for the dielectric grains is then squeezed out to the dielectric layers 111 during sintering.

The grain growth adjusting ingredient may be a grain growth promoter, or a grain growth inhibitor, or may be both a grain growth promoter and a grain growth inhibitor.

The grain growth promoter may be any one or more of Li, Bi, B, Na, and K, but is not limited thereto.

Further, the grain growth inhibitor may be any one or more of Mg, Si, V, Yb, Y, Zr, and S, but is not limited thereto.

In detail, according to the exemplary embodiment, the internal electrodes 121 and 122 may contain the ceramic component containing the grain growth adjusting ingredient for the dielectric grains 11. The dielectric layer 111 may be composed of interfacial portions 111b adjacent to the internal electrodes 121 and 122, and of a central portion 111a disposed between the interfacial portions 111b. Concentrations of the grain growth adjusting ingredient in the interfacial portions 111b and the central portion 111a may reach different levels from each other dependent on the distance from the internal electrodes 121 and 122.

Particularly, to obtain at least one dielectric grain 11, having the ratio of the long axis to the short axis of 3.5 or more, to be contained in the single dielectric layer 111 as in the first exemplary embodiment, a method may be performed of adjusting a concentration of the grain growth promoter in the interfacial portions 111b to be higher than that in the central portion 111a.

A method and mechanism for adjusting the concentrations of the grain growth adjusting ingredient in the interfacial portions 111b and the central portion 111a to be different from each other will be described below in more detail.

According to the exemplary embodiment, the dielectric grain 11, having the ratio of the long axis to the short axis of 3.5 or more, may be contained in the single dielectric layer 111 at a content of 0.1% to 30%.

More specifically, in a case in which one out of five-hundred (500) dielectric grains present in the single dielectric layer 111 is a dielectric grain 11 having the ratio of the long axis to the short axis of 3.5 or more, permittivity may be increased by 2% or more as compared to a case in which there is no dielectric grain 11 having the ratio of the long axis to the short axis of 3.5 or more.

Further, in a case in which one out of one-hundred (100) dielectric grains present in the single dielectric layer 111 is a dielectric grain 11 having the ratio of the long axis to the short axis of 3.5 or more, permittivity may be increased by 13% or more as compared to the case in which there is no dielectric grain 11 having the ratio of the long axis to the short axis of 3.5 or more.

Furthermore, in a case in which one out of ten (10) dielectric grains present in the single dielectric layer 111 is a dielectric grain 11 having the ratio of the long axis to the short axis of 3.5 or more, permittivity may be increased by 130% or more as compared to the case in which there is no dielectric grain 11 having the ratio of the long axis to the short axis of 3.5 or more.

Meanwhile, a dielectric grain 11 having the ratio of the long axis to the short axis of 2.0 or more may be contained in the single dielectric layer 111 at a content of 5% or more to 26% or less (e.g., 5% to 26%).

Further, a dielectric grain 11 having the ratio of the long axis to the short axis of 1.5 or more may be contained in the single dielectric layer 111 at a content of 30% or more to 77% or less.

According to the exemplary embodiment, the internal electrodes 121 and 122 may contain a ceramic component 21 trapped therein.

The ceramic component 21 may be a dielectric material doped with an additive, such as a barium titanate based dielectric material doped with an additive.

According to the exemplary embodiment, since the additive is doped on the ceramic component 21 trapped in the internal electrodes 121 and 122, reduction resistance of the ceramic component 21 may be further improved, and insulation properties of the ceramic component 21 after sintering may be improved as compared to a case of using a pure barium titanate dielectric material as a ceramic component.

Therefore, a flow of over-current to the internal electrodes 121 and 122 may be suppressed due to improvement of reduction resistance and insulation properties of the ceramic component 21 trapped in the internal electrodes 121 and 122. Further, even if the internal electrodes 121 and 122 are overheated, generation of insulation degradation may be decreased by preventing aggregation and disconnection of the electrodes, thereby improving long-term reliability of the multilayer ceramic electronic component.

The additive may be one or more elements selected from the group consisting of calcium (Ca), valence acceptor elements, and rare earth elements.

The valence acceptor element may include one or more of magnesium (Mg) and manganese (Mn), and the rare earth element may include one or more of yttrium (Y), gadolinium (Gd), dysprosium (Dy), holmium (Ho), europium (Eu), erbium (Er), and ytterbium (Yb).

Particularly, the ceramic component 21 may contain the grain growth adjusting ingredient for the dielectric grains, wherein the grain growth adjusting ingredient may be the grain growth promoter or the grain growth inhibitor, or may be both the grain growth promoter and the grain growth inhibitor.

The grain growth promoter may be any one or more of Li, Bi, B, Na, and K, but is not necessarily limited thereto.

Further, the grain growth inhibitor may be any one or more of Mg, Si, V, Yb, Y, Zr, and S, but is not limited thereto.

Although described in detail below, according to the exemplary embodiment, a composition of the dielectric layer 111 may be adjusted by a composition of the additive of the ceramic component 21 contained in the internal electrodes 121 and 122.

Therefore, in order to implement physical properties of the dielectric layer 111, the additive may be suitably selected.

For example, the ceramic component 21 may be a dielectric material co-doped with one or more of the valence acceptor elements and calcium (Ca).

Alternatively, the ceramic component 21 may be a dielectric material co-doped with one or more of the rare earth elements and calcium (Ca), or a dielectric material co-doped with one or more of the valence acceptor elements and one or more of the rare earth elements.

Alternatively, the ceramic component 21 may be a dielectric material co-doped with one or more of the valence acceptor elements, one or more of the rare earth elements, and calcium (Ca).

According to the exemplary embodiment, a cross-sectional area occupied by the ceramic component 21 in a cross-sectional area of the internal electrodes 121 and 122 may be 3% to 30%.

In a case in which the area occupied by the ceramic component 21 in an area of the internal electrode (121 or 122) is 3% or less, an effect of decreasing generation of insulation degradation may be insufficient. Conversely, in a case in which the area occupied by the ceramic component 21 is 30% or more, connectivity of the internal electrodes may be deteriorated due to an increase in anon-conductive region in the internal electrode, and thus capacitance may be decreased.

According to the exemplary embodiment, the dielectric layer 111 may contain the same additive as the additive contained in the ceramic component 21, and the dielectric layer 111 may have a concentration gradient of the additive element in the thickness direction of the dielectric layer 111.

For example, in the dielectric layer 111, the concentration of the additive may be gradually decreased from an interface adjacent to the internal electrode (121 or 122) toward the central portion thereof in the thickness direction.

Further, according to the exemplary embodiment, the dielectric layer 111 may have a concentration gradient of the grain growth adjusting ingredient for the dielectric grains in the thickness direction of the ceramic body.

The additive present in the dielectric layer 111 may be contained in the dielectric layer 111 while the additive contained in an internal electrode paste (e.g., in the ceramic component 21 included in the internal electrode paste) is released from the internal electrode paste (e.g., and released from the ceramic component 21 included in the internal electrode paste) during sintering to thereby form a part of the dielectric layer.

Therefore, the concentrations of the additive and the grain growth adjusting ingredient for the dielectric grains in the dielectric layer 111 in the central portion 111a in the thickness direction of the dielectric layer 111 may be different from those in the vicinity of the interfaces between the dielectric layer 111 and the internal electrodes 121 and 122 (e.g., in regions 111b adjacent to the internal electrodes).

As described above, since the concentrations of the additive and the grain growth adjusting ingredient for the dielectric grains in the dielectric layer 111 are different depending on positions, the shape of the dielectric grain may be controlled, and shapes of the dielectric grain in the central portion 111a and the interfacial portions 111b of the dielectric layer 111 may be controlled to be different from each other.

For example, in a case in which at least one dielectric grain 11, having the ratio of the long axis to the short axis of 3.5 or more, is contained in the single dielectric layer 111 as illustrated in FIG. 3, a concentration of the grain growth promoter in the interfacial portions 111b may be higher than that in the central portion 111a of the dielectric layer 111.

The interfacial portions 111b and the central portion 111a are not distinguished in the dielectric layer 111, but may be formed integrally with each other, and may be distinguished by distance from the internal electrodes 121 and 122.

According to an exemplary embodiment, the interfacial portion 111b may be defined as a region of which a distance from the interface between the internal electrode (121 or 122) and the dielectric layer 111 is within 20% of a thickness of the dielectric layer 111.

Barium titanate ($BaTiO_3$) can be used as a material of a dielectric layer 111 to provide high permittivity. However, the use of barium titanate ($BaTiO_3$) may reduce resistance of the dielectric layer. Thus, in the case of thinning dielectric layers and internal electrodes, it may be difficult to form a reliable component using barium titanate ($BaTiO_3$) to form the dielectric layer.

Further, by using a dielectric layer containing an additive to improve reduction resistance and reliability of the dielectric layer, permittivity may be decreased, and a dissipation factor (DF) may be increased.

Therefore, according to the exemplary embodiment, the dielectric layer may contain the additive element, but the additive element may not be uniformly contained in the dielectric layer in the thickness direction. Instead, the additive element may be further contained (or concentrated) in the interfacial portions 111b of the dielectric layer 111 adjacent to the internal electrodes (121, 122).

Insulation degradation resulting from damage to dielectric layers 111 during use of a multilayer ceramic electronic component 100 may be caused by accumulation of oxygen vacancy in interfacial portions of the dielectric layers 111 adjacent to internal electrodes 121 or 122. Therefore, in a case in which an additive improving reduction resistance and reliability of barium titanate is mainly present in the interfacial portions 111b of the dielectric layer (as in the exemplary embodiment), high permittivity and a low dissipation factor may be implemented, and reliability may be also be improved.

Further, according to the exemplary embodiment, the concentration of the additive may be higher in the interfacial portions 111b in which oxygen vacancy is mainly accumulated in the dielectric layer, and which is the region of the dielectric layer that is within a distance from a boundary of the internal electrode of 20% or less of the entire thickness of the dielectric layer, and thus high permittivity and a low dissipation factor may be efficiently implemented, and reliability may also be improved.

According to the exemplary embodiment, the additive element may mainly be contained in the interfacial portions 111b of the dielectric layer 111, and thus the concentration of the additive element in the interfacial portions 111b of the dielectric layer may be higher than that in the central portion 111a thereof.

As in the exemplary embodiment, since the additive element is not uniformly contained in the dielectric layer 111 but is instead contained at a higher concentration in the interfacial portions 111b as compared to the central portion 111a, a decrease in permittivity of the multilayer ceramic electronic component is prevented, a dissipation factor is decreased, and reliability is improved.

As described again below in relation to a method of manufacturing a multilayer ceramic electronic component, the dielectric layers 111 and the internal electrodes 121 and 122 may be formed by sintering a multilayer body obtained by applying an internal electrode paste on a plurality of ceramic green sheets forming the dielectric layers and stacking these ceramic green sheets.

According to the exemplary embodiment, the internal electrode paste for forming an internal electrode may contain the ceramic component doped with the additive element, and the ceramic component contains the grain growth adjusting ingredient for the dielectric grains, and thus the concentration of the additive in the interfacial portions 111b of the dielectric layer 111 adjacent to the internal electrodes may be higher than that of the additive in the central portion 111a of the dielectric layer 111, and the dielectric layer may have a concentration gradient of the grain growth adjusting ingredient for the dielectric grains in the thickness direction of the ceramic body.

While the multilayer body including the ceramic green sheet onto which the internal electrode paste is applied is sintered, the ceramic component contained in the internal electrode paste may be released from the internal electrode, and may move toward the ceramic green sheet to thereby form a portion of the dielectric layer. In this case, the ceramic component may mainly be disposed in the interfacial portions 111b of the dielectric layer 111 adjacent to the internal electrodes 121 and 122.

Similarly, the grain growth adjusting ingredient for the dielectric grains may mainly be disposed in the interfacial portions 111b of the dielectric layer 111 adjacent to the internal electrodes 121 and 122 by the mechanism as described above.

Intentionally, the grain growth promoter or grain growth inhibitor, which is the grain growth adjusting ingredient for the dielectric grains, may mainly be disposed in the interfacial portions 111b of the dielectric layer 111 using a sputtering method in addition to the above-mentioned method.

According to the exemplary embodiment, the ceramic component contained in the internal electrode paste may contain the dielectric material doped with the additive element, and the additive element may be uniformly dispersed in the interfacial portions 111b of the dielectric layer 111 as compared to a case of adding a separate additive to the internal electrode paste without doping the additive element or a case of adding a ceramic component having a surface that is coated with an additive to the internal electrode paste.

In a case in which the additive element is not doped on a barium titanate based compound but is separately present in the ceramic component (unlike the exemplary embodiment), while internal electrodes 121 and 122 are sintered, the additive may not completely solid-dissolve in a ceramic component or a base material main ingredient of the dielectric material forming the dielectric layer 111, and thus the additive may be present in a segregated form. In this case, a secondary phase deteriorating connectivity of the internal electrodes 121 and 122 and electrical properties in the dielectric materials may be formed, and thus capacitance may be decreased. Reliability may further be deteriorated.

However, in a case of using the dielectric material doped with the additive element as a ceramic component having a sintering temperature higher than that of an internal electrode paste as in the exemplary embodiment, while the internal electrodes 121 and 122 are sintered, segregation of the additive and a secondary phase caused by the additive may be suppressed, and thus a decrease in capacitance may be prevented. Reliability may thus be improved.

Further, the ceramic component squeezed-out toward an interface of the internal electrode 121 and 122 and the ceramic green sheet during sintering may form the dielectric layer 111 together with a compound contained in the ceramic green sheet, and thus the dissipation factor of the dielectric layer 111 may be decreased. Reliability may thereby be improved.

The additive may be one or more elements selected from the group consisting of calcium (Ca), valence acceptor elements, and rare earth elements.

The valence acceptor element may include one or more of magnesium (Mg) and manganese (Mn), and the rare earth element may include one or more of yttrium (Y), gadolinium (Gd), dysprosium (Dy), holmium (Ho), europium (Eu), erbium (Er), and ytterbium (Yb).

In a case in which the ceramic component 21 is doped with calcium (Ca), reduction resistance may be improved, and reliability may be improved by suppressing movement of oxygen vacancy.

In a case in which the ceramic component 21 is doped with one or more of the valence acceptor elements (Mg and Mn), the ceramic component may prevent the dielectric material from being reduced and semiconductorized when sintered under a reduction atmosphere.

In a case in which the ceramic component 21 is doped with one or more of the rare earth elements (Y, Gd, Dy, Ho, Eu, Er, and Yb), since both of the A site and the B site of the barium titanate based dielectric material may be replaced with the rare earth element, balance may be maintained during sintering, and thus reliability of the multilayer ceramic electronic component may be improved.

According to the exemplary embodiment, although not limited, the dielectric layer 111 may be formed of a single dielectric grain 11 in the thickness direction, and even though the dielectric layer 111 contains the single dielectric grain 11, a content of the additive element in a shell portion of the dielectric grain may be higher than that in a core portion thereof.

Further, in a case in which the dielectric layer 111 is formed of a single dielectric grain 11 in the thickness direction, a content of the additive element in a region of the shell portion of the dielectric grain 11 corresponding to the interfacial portion 111b may be higher than that in a region included in the central portion 111a thereof.

As described above, in the case in which the ceramic component contained in the internal electrode paste is squeezed-out toward the interface with the ceramic green sheet during sintering to form the dielectric layer 111, the dielectric material doped with the additive, forming the ceramic component may enclose dielectric powder contained in the ceramic green sheet to form the shell portion of the dielectric grain 11.

Therefore, according to the exemplary embodiment, the shell portion of the dielectric grain 11 included in the interfacial portions 111b may contain the dielectric material doped with the additive, and the content of the additive in the shell portion of the dielectric grain 11 included in the interfacial portions 111b of the dielectric layer 111 may be higher than that in the core portion thereof.

The ceramic component 21 that is not released from the internal electrode paste during sintering of the internal electrode paste and the ceramic green sheet may remain in the internal electrode 121 and/or 122 after sintering, and may decrease generation of insulation degradation.

According to the exemplary embodiment, a size of the ceramic component trapped in the internal electrode 121 and 122 after sintering may be 1 nm to 300 nm.

Referring to FIGS. 1 and 2 again, the upper and lower cover layers included in the ceramic body 110 may be formed by stacking a single or two or more dielectric layers 111 on the upper and lower surfaces of the active part in a vertical direction, respectively, and may serve to prevent the internal electrodes 121 and 122 from being damaged by physical or chemical stress.

The first and second external electrodes 131 and 132 may be disposed on both end portions of the ceramic body 110, respectively, and may be electrically connected to the exposed end portions of the first and second internal electrodes 121 and 122, respectively, thereby configuring a capacitor circuit.

Although not limited, the external electrodes 131 and 132 may contain copper (Cu) as a conductive material. Although not limited, the external electrodes 131 and 132 may further contain glass and be formed by an external electrode paste containing the conductive material and the glass. The glass may be contained in the external electrode paste in a form of glass frit.

The external electrodes 131 and 132 may be formed by sintering the external electrode paste.

According to the exemplary embodiment, the multilayer ceramic electronic component 100 having high capacitance, a low dissipation factor, and excellent reliability may be provided by including the dielectric layers of which the concentration of the additive is different in the thickness direction.

Figure 4:
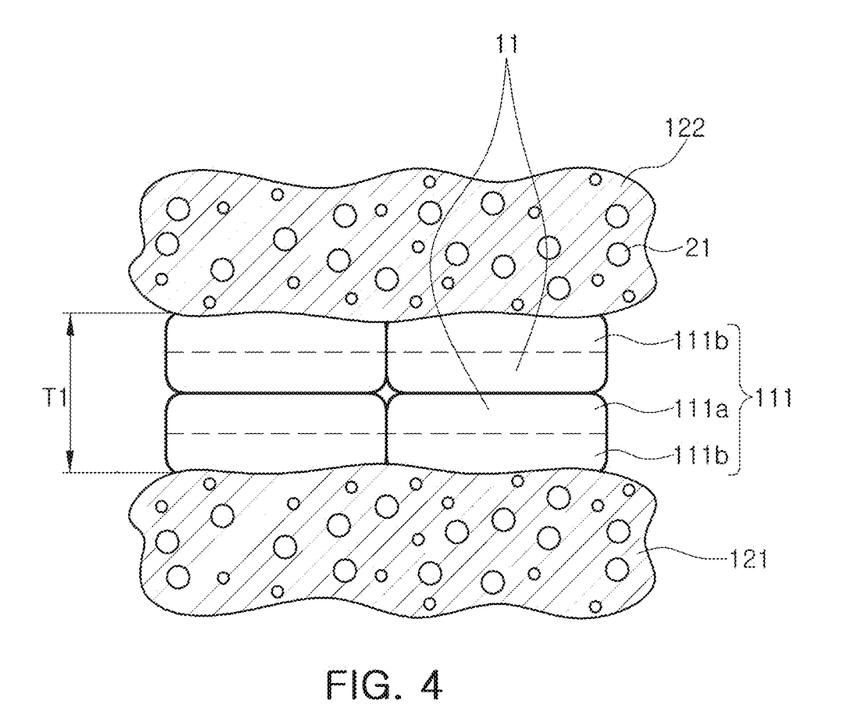
FIG. 4 is an enlarged view of part P of FIG. 2 according to a second exemplary embodiment.

FIG. 4 is an enlarged view of part P of FIG. 2 according to a second exemplary embodiment.

Referring to FIG. 4, it may be appreciated that a dielectric layer 111 may be formed of two dielectric grains 11 in the thickness direction.

A method of adjusting shapes or disposition of the dielectric grains 11 as described above may be performed by adjusting the grain growth promoter so that a concentration of the grain growth promoter in a central portion 111a of the dielectric layer 111 is low, a concentration thereof in interfacial portions 111b of the dielectric layer 111 is high, and a difference in the concentrations of the grain growth promoter between the interfacial portions 111b and the central portion 111a is large.

In a case in which the dielectric layer 111 has a structure including the dielectric grains 11 as illustrated in FIG. 4, permittivity may be high and direct current (DC)-bias characteristics may be excellent.

Further, breakdown voltage (BDV) may be higher than that of the first exemplary embodiment of FIG. 3 described above. For example, the BDV may be increased by about 10% or more.

In detail, according to the second exemplary embodiment, permittivity may be about 6000, and a capacitance change rate at DC 3V or more may be within 70%.

Figure 5:
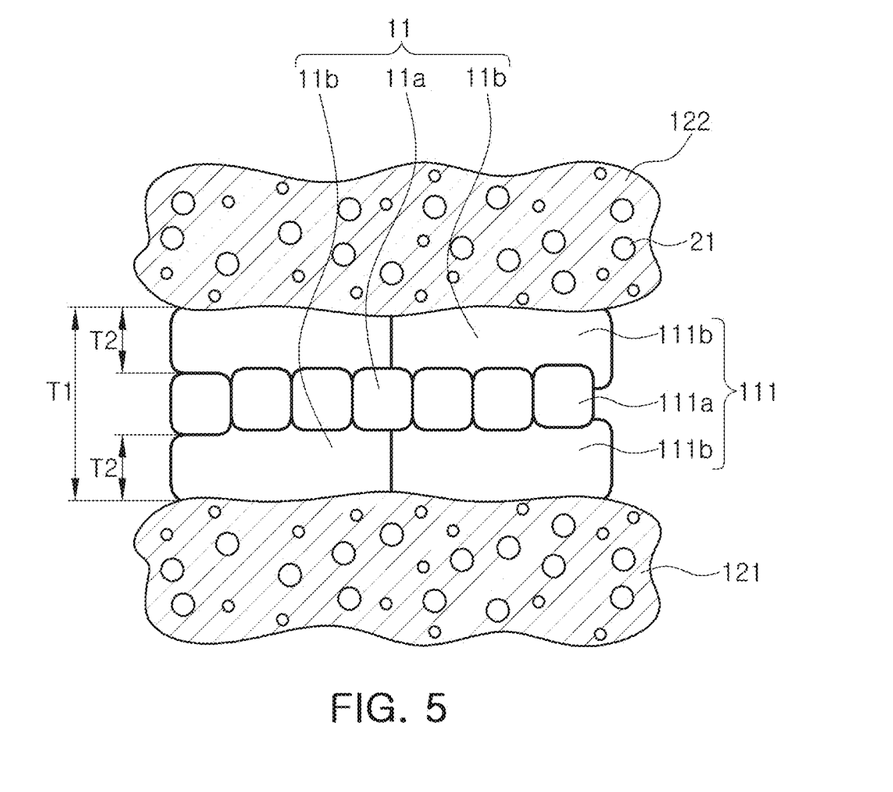
FIG. 5 is an enlarged view of part P of FIG. 2 according to a third exemplary embodiment.

FIG. 5 is an enlarged view of part P of FIG. 2 according to a third exemplary embodiment.

Referring to FIG. 5, it may be appreciated that a dielectric layer 111 is formed of three dielectric grains 11 in the thickness direction, but a size of a dielectric grain 11b in interfacial portions 111b of the dielectric layer 111 is larger than that of a dielectric grain 11a of a central portion 111a of the dielectric layer 111.

A method of adjusting shapes or disposition of the dielectric grains 11 as described above may be performed by adjusting the concentration of grain growth inhibitor to be contained in the central portion 111a of the dielectric layer 111 and adjusting the concentration of grain growth promoter to be contained in the interfacial portions 111b of the dielectric layer 111.

In a case in which the dielectric layer 111 has a structure including the dielectric grains 11 as illustrated in FIG. 5, permittivity may be high and DC-bias characteristics may be excellent.

Further, breakdown voltage (BDV) may be higher than that of the first exemplary embodiment of FIG. 3 described above. For example, the BDV may be increased by about 10% or more.

In detail, according to the third exemplary embodiment, permittivity may be about 5000, and a capacitance change rate at DC 3V or more may be within 60%.

Meanwhile, according to the third exemplary embodiment, a ratio (T2/T1) of a thickness T2 (e.g., an average thickness) of the dielectric grain 11b present in the interfacial portions 111b adjacent to the internal electrodes 121 and 122 to a thickness T1 (e.g., an average thickness) of the dielectric layer 111 may be 10% to 45%.

Further, an average particle size of the dielectric grain 11a of the central portion 111a disposed between the interfacial portions 111b may be equal to or less than 85% of an average particle size of the dielectric grain 11b present in the interfacial portions 111b.

Figure 6:
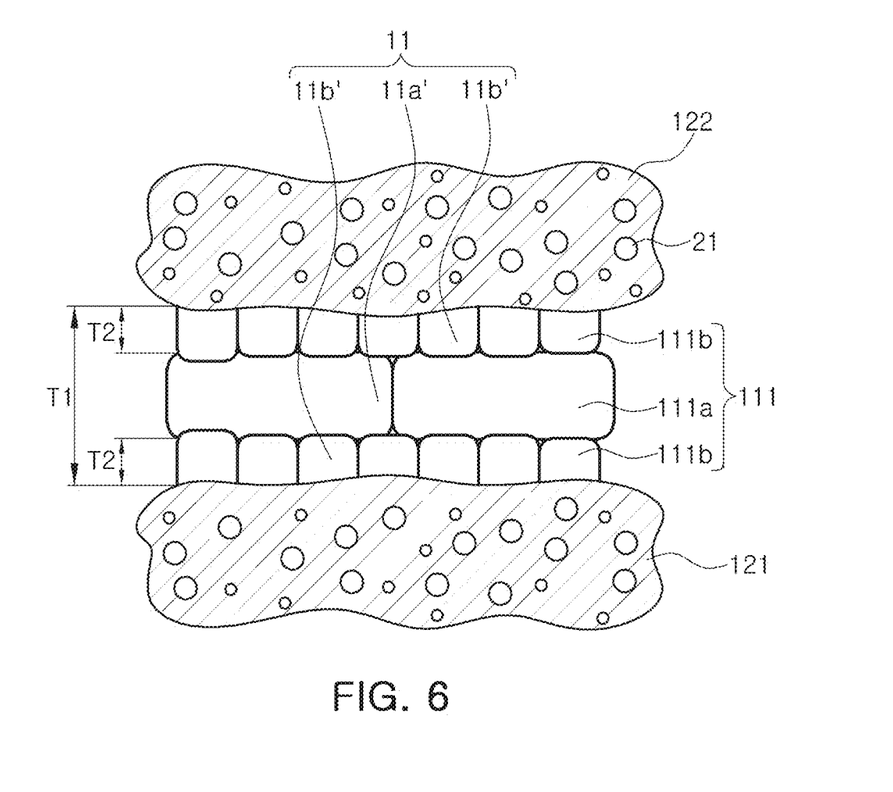
FIG. 6 is an enlarged view of part P of FIG. 2 according to a fourth exemplary embodiment.

FIG. 6 is an enlarged view of part P of FIG. 2 according to a fourth exemplary embodiment.

Referring to FIG. 6, it may be appreciated that a dielectric layer 111 is formed of three dielectric grains 11 in the thickness direction, but a size of a dielectric grain 11b' in interfacial portions 111b of the dielectric layer 111 is smaller than that of a dielectric grain 11a' of a central portion 111a of the dielectric layer 111.

A method of adjusting shapes or disposition of the dielectric grains 11 as described above may be performed by adjusting the concentration of grain growth promoter to be contained in the central portion 111a of the dielectric layer and adjusting the concentration of grain growth inhibitor squeezed-out from the internal electrodes 121 and 122 to be contained in the interfacial portions 111b of the dielectric layer 111 so as to suppress grain growth of the dielectric material 111.

In a case in which the dielectric layer 111 has a structure including the dielectric grains as illustrated in FIG. 6, permittivity may be relatively low as compared to the first to third exemplary embodiments, but may be high as compared to a structure of a general multilayer ceramic capacitor, and DC-bias characteristics may be excellent.

Further, breakdown voltage (BDV) may be higher than that of the first exemplary embodiment of FIG. 3 described above. For example, the BDV may be increased by about 10% or more.

In addition, insulation resistance (IR) may be high, and a deviation or variability may be small, and thus reliability may be excellent and a change in capacitance at a high temperature may be low.

In detail, according to the fourth exemplary embodiment, permittivity may be about 4000, and a capacitance change rate at DC 3V or more may be within 60%.

Meanwhile, according to the fourth exemplary embodiment, a ratio (T2/T1) of a thickness T2 (e.g., an average thickness) of the dielectric grain 11b' present in the interfacial portions 111b adjacent to the internal electrodes 121 and 122 to a thickness T1 (e.g., an average thickness) of the dielectric layer 111 may be 2% to 30%.

Further, an average particle size of the dielectric grain 11b' present in the interfacial portions 111b may be equal to or less than 85% of an average particle size of the dielectric grain 11a' of the central portion 111a disposed between the interfacial portions 111b.

According to another exemplary embodiment, a multilayer ceramic electronic component 100 includes a ceramic body 110 in which dielectric layers 111 and internal electrodes 121 and 122 are alternately stacked. The dielectric layers 111 may contain at least one dielectric grain 11 having a ratio of a long axis to a short axis that is 3.5 or more. The internal electrodes 121 and 122 may contain a grain growth adjusting ingredient for dielectric grains, which is any one or more of a grain growth promoter and a grain growth inhibitor, and the dielectric layers 111 have a concentration gradient of the grain growth adjusting ingredient for the dielectric grains in a thickness direction of the ceramic body 110.

A method of manufacturing a multilayer ceramic electronic component according to an exemplary embodiment may include preparing ceramic green sheets containing barium titanate based powder (S1), and applying an internal electrode paste containing a ceramic component containing a grain growth adjusting ingredient for dielectric grains and doped with an additive element onto the ceramic green sheets (S2). In turn, the ceramic green sheets on which the internal electrode paste is applied are stacked to form a multilayer body (S3), and the multilayer body is sintered to prepare a ceramic body (S4).

When preparing the plurality of ceramic green sheets (S1), a dielectric slurry containing the barium titanate based powder may be applied and dried onto a carrier film.

The ceramic green sheet generally does not contain the additive element contained in the ceramic component, or in the case in which the ceramic green sheet contains the additive element, a concentration of the additive element contained in the ceramic green sheet is lower than that of the additive element contained in the ceramic component. Thus, the concentration gradient may be formed in the dielectric layer after sintering.

According to the exemplary embodiment, the concentration of the additive element with respect to a dielectric base material contained in the ceramic component may be higher than that of the additive element with respect to a dielectric base material contained in dielectric slurry forming the ceramic green sheet.

The application of the internal electrode paste (S2) may be performed by printing the internal electrode paste on the ceramic green sheets, but a method of forming internal electrode patterns is not limited thereto.

The internal electrode paste may contain nickel (Ni), copper (Cu), palladium (Pd), or alloys thereof as an electrode material, but is not limited thereto.

According to the exemplary embodiment, the internal electrode paste may contain the ceramic component, wherein the ceramic component may contain the grain growth adjusting ingredient for the dielectric grains, and may contain a dielectric material doped with an additive depending on physical properties required in the dielectric layers.

The additive may be one or more elements selected from the group consisting of calcium (Ca), valence acceptor elements, and rare earth elements.

For example, the ceramic component may be calcium-doped barium titanate ($Ba_{1-x}Ca_xTiO_3$). Although not limited, x may satisfy $0.01 \leq x \leq 0.2$.

According to the exemplary embodiment, a particle size of the ceramic component contained in the internal electrode paste may be 1 nm to 50 nm, and preferably 1 nm to 30 nm.

In a case in which the particle size of the ceramic component is less than 1 nm, an effect of suppressing necking between conductive materials (for example, nickel)

contained in the internal electrode paste may be insufficient during sintering, and thus connectivity of internal electrodes may be deteriorated.

Further, in a case in which the particle size of the ceramic component is more than 50 nm, the ceramic component contained in the internal electrode paste may be rapidly squeezed-out toward interfaces between the internal electrodes and the ceramic green sheets during sintering, and thus the ceramic component may not properly perform a function of suppressing the sintering of the internal electrodes, thereby deteriorating connectivity of the internal electrodes.

In a case in which the particle size of the ceramic component is 1 nm to 50 nm, connectivity of the internal electrodes may be improved, and thus dielectric properties of the multilayer ceramic electronic component may be improved.

The ceramic component that is not squeezed-out toward the interfaces during sintering may remain in the internal electrodes. A particle size of the ceramic component trapped to remain in the internal electrodes after sintering may be 1 nm to 300 nm due to grain growth of the ceramic component during sintering. More preferably, the particle size of the ceramic component trapped to remain in the internal electrodes after sintering may be 1 nm to 100 nm.

Next, the multilayer body may be formed by stacking the ceramic green sheets on which the internal electrode pattern is formed (S3). Further, in order to form upper and lower cover layers, the ceramic green sheets on which the internal electrode pattern is not formed may be stacked on upper and lower surfaces of the multilayer body formed of the ceramic green sheets on which the internal electrode pattern is formed.

Then, the ceramic body including the internal electrodes and dielectric layers may be formed by sintering the multilayer body (S4).

According to the exemplary embodiment, the method of manufacturing a multilayer ceramic electronic component may further include, before the sintering of the ceramic multilayer body, pressing the multilayer body and cutting the pressed multilayer body in a form of individual electronic components so that ends of the internal electrode patterns are exposed to alternate cutting surfaces.

According to the exemplary embodiment, a part of the ceramic component contained in the internal electrode paste may be released toward the interfaces between the internal electrodes and the ceramic green sheets during the sintering of the multilayer body, thereby forming the dielectric layers together with the ceramic green sheets.

Therefore, concentrations of the grain growth adjusting ingredient for the dielectric grains and the additive in the central portion 111a and the interfacial portions 111b of the dielectric layer 111 may be different from each other. That is, the concentration gradient may be formed.

According to the exemplary embodiment, 10% to 90% of the ceramic component contained in the internal electrode paste may be released from the internal electrode paste during sintering by controlling a sintering profile. As a result, portions (mainly disposed in the interfaces) of the dielectric layers 111 may contain more of the ceramic component. The remainder of the ceramic component may remain in the internal electrodes.

For example, the ceramic component contained in the internal electrode paste may be smoothly released to the interfaces using a difference in sintering properties between an electrode material and the ceramic component contained in the internal electrode by rapidly increasing a temperature in a predetermined region during sintering.

FIG. 7 is a scanning electron microscope (SEM) photograph obtained by cutting a multilayer body subject to the sintering according to an exemplary embodiment to observe cross sections of internal electrodes 121 and 122 and dielectric layers 111.

The ceramic component contained in the internal electrode paste may be squeezed-out toward the interfaces of the dielectric layers 111 during sintering.

Referring to FIG. 7, after the sintering is completed, the dielectric material doped with the additive, which forms or is included in the ceramic component, may be absorbed in the shell portion of the dielectric grain 11 contained in the green sheet to thereby form the dielectric layer 111.

In addition, it may be appreciated that the dielectric layer 111 may be formed of a single dielectric grain 11 in a thickness direction.

Thereafter, external electrodes may be formed by applying an external electrode paste on an outer surface of the ceramic body 110. Application of the external electrode paste may be performed by dipping the ceramic body 110 in the external electrode paste, but is not limited thereto.

According to the exemplary embodiment, the external electrode paste may contain nickel (Ni), copper (Cu), palladium (Pd), gold (Au), silver (Ag), or alloys thereof, but the material of the external electrode paste is not limited thereto.

The external electrodes 131 and 132 may be formed by sintering the external electrode paste applied onto the ceramic body 110.

Among descriptions of the method of manufacturing a multilayer ceramic electronic component according to the present exemplary embodiment, a description overlapping the description of the multilayer ceramic electronic component according to the exemplary embodiment described above will be omitted.

Experimental Example

Inventive Example 1

An internal electrode paste containing 5% of lithium (LI) corresponding to a grain growth promoter and barium titanate ($BaTiO_3$, hereinafter referred to as BT) powder having a particle size of 10 nm was prepared. Meanwhile, after adding a sintering additive, a binder, and an organic solvent such as ethanol, or the like, to dielectric raw material powder containing barium titanate ($BaTiO_3$) powder containing 0.1% lithium (Li) corresponding to the grain growth promoter, and wet-mixing them with each other to prepare dielectric slurry, the prepared dielectric slurry was applied and dried on a carrier film, thereby forming ceramic green sheets.

Next, after printing the internal electrode paste containing the BT powder containing the grain growth promoter as the ceramic component on the ceramic green sheets, a multilayer body was formed by stacking the ceramic green sheets on which internal electrode patterns were printed, followed by compressing and cutting the multilayer body.

Then, after heating the cut multilayer body to remove the binder, the multilayer body was sintered at a high temperature under a reduction atmosphere, thereby forming a ceramic body. A temperature was rapidly raised at a predetermined region during the sintering, and thus as the internal electrodes were sintered, the BT powder (ceramic component) contained in the internal electrode paste was allowed to be squeezed-out toward interfaces between internal electrodes and dielectric layers. After the BT powder was squeezed-out, the BT powder squeezed-out toward interfaces between the internal electrodes and ceramic green sheets was allowed to not be diffused in central portions of the dielectric layers by rapidly sintering the ceramic green sheets.

External electrodes connected to the internal electrodes were formed by applying and sintering an external electrode paste containing glass frit and copper on both end surfaces of the ceramic body manufactured as described above.

Comparative Example 1

An internal electrode paste containing barium titanate (BaTiO$_3$) powder having a particle size of 10 nm without containing the grain growth promoter as a ceramic component was prepared. Other conditions were the same as those in Inventive Example 1 except for adding the BT powder that does not contain the grain growth promoter to the internal electrode paste as the ceramic component.

Comparative Example 2

An internal electrode paste containing barium titanate (BaTiO$_3$) powder having a particle size of 10 nm without containing the grain growth promoter as a ceramic component was prepared. A content of lithium contained in the BT powder corresponding to a material of the dielectric layer was increased so as to have the same content of the grain growth promoter in the entire electronic component. Other conditions were the same as those in Comparative Example 1.

The following Table 1 shows unexpected resulting data obtained by measuring permittivity (relative permittivity), capacitance change rates (DC-bias), and break-down voltage (BDV) characteristics of the multilayer ceramic electronic components manufactured according to Inventive Example 1 and Comparative Examples 1 and 2.

Room-temperature permittivity and the capacitance change rate (DC bias) were measured at 1 KHz and 1V using an Agilent 4284A meter. The BDV was measured using a Keithley meter, and while applying a voltage which was swept from 0V to 1.00000V, a voltage value at a moment at which a current value was 10 mA was measured as the BDV value.

TABLE 1

| Sample | Permittivity | Capacitance Change Rate (DC-bias) | BDV (V) |
| --- | --- | --- | --- |
| Inventive Example 1 | 7114 | 43% | 52 |
| Comparative Example 1 | 3520 | 39% | 48 |
| Comparative Example 2 | 6783 | 61% | 26 |

Referring to Table 1, it may be confirmed that, in Inventive Example 1, in which concentration of the grain growth promoter was high in the interfacial portions 111b of the dielectric layer 111 adjacent to the internal electrodes 121 and 122 and the central portion 111a thereof, but particularly, the concentration of the grain growth promoter was higher in the interfacial portions 111b, and thus, at least one dielectric grain 11 having a ratio of a long axis to a short axis that was 3.5 or more was present therein, permittivity was high as compared to Comparative Examples 1 and 2 in which the dielectric layer did not contain the grain growth promoter, and thus capacitance of the multilayer ceramic electronic component was increased.

Further, in Inventive Example 1, capacitance change rate (DC-bias) characteristics were excellent as compared to a case in which the grain growth promoter was not contained in the ceramic component of the internal electrodes (Comparative Example 2).

In addition, it may be confirmed that, in Inventive Example 1, the breakdown voltage was increased as compared to Comparative Example 1 or 2 in which the dielectric layer did not contain the grain growth promoter.

Inventive Example 2

An internal electrode paste containing 5% magnesium (Mg) corresponding to a grain growth inhibitor and Ca-doped BT powder (Ba$_{0.99}$Ca$_{0.01}$TiO$_3$) containing 10% calcium (Ca) doped thereon and having a particle size of 10 nm was prepared. Meanwhile, after adding a sintering additive, a binder, and an organic solvent such as ethanol, or the like, to dielectric raw material powder containing barium titanate (BaTiO$_3$) powder and wet-mixing them with each other to prepare dielectric slurry, the prepared dielectric slurry was applied and dried on a carrier film, thereby forming ceramic green sheets.

Next, after printing the internal electrode paste containing the Ca-doped BT powder containing magnesium corresponding to the grain growth inhibitor as the ceramic component on the ceramic green sheets, a multi layer body was formed by stacking the ceramic green sheets on which internal electrode patterns were printed, followed by compressing and cutting the multilayer body.

Then, after heating the cut multilayer body to remove the binder, the multilayer body was sintered at a high temperature under a reduction atmosphere, thereby forming a ceramic body. A temperature was rapidly raised at a predetermined region during the sintering, and thus as the internal electrodes were sintered, the Ca-doped BT powder (ceramic component) contained in the internal electrode paste was allowed to be squeezed-out toward interfaces between internal electrodes and dielectric layers. In addition, magnesium corresponding to the grain growth inhibitor was also allowed to be squeezed-out toward the interfaces of the dielectric layers.

After magnesium and the Ca-doped BT powder were squeezed-out, the magnesium and Ca-doped BT powder squeezed-out toward interfaces between the internal electrodes and ceramic green sheets were allowed not to be diffused in central portions of the dielectric layers by rapidly sintering the ceramic green sheets.

External electrodes connected to the internal electrodes were formed by applying and sintering an external electrode paste containing glass frit and copper on both end surfaces of the ceramic body manufactured as described above.

Comparative Example 3

An internal electrode paste containing barium titanate (BaTiO$_3$) powder having a particle size of 10 nm without containing magnesium (Mg) corresponding to the grain growth inhibitor as a ceramic component was prepared. Other conditions were the same as those in Inventive Example 2 except for adding the BT powder that does not contain magnesium (Mg) corresponding to the grain growth inhibitor to the internal electrode paste as the ceramic component.

The following Table 2 shows unexpected resulting data obtained by measuring permittivity (relative permittivity), capacitance change rates (DC-bias), and breakdown voltage (BDV) characteristics of the multilayer ceramic electronic components manufactured according to Inventive Example 2 and Comparative Example 3.

Room-temperature permittivity and capacitance change rates (DC-bias) were measured at 1 KHz and 1V using an Agilent 4284A meter. The BDV was measured using a Keithley meter, and while applying a voltage which was swept from 0V to 1.00000V, a voltage value at a moment at which a current value was 10 mA was measured as the BDV value.

TABLE 2

| Sample | Permittivity | Capacitance Change Rate (DC-bias) | BDV (V) |
| --- | --- | --- | --- |
| Inventive Example 2 | 4012 | 30% | 65 |
| Comparative Example 3 | 3505 | 42% | 32 |

Referring to Table 2, it may be confirmed that, in Inventive Example 2 in which a content of magnesium (Mg) corresponding to the grain growth inhibitor was high in the interfacial portions of the dielectric layers adjacent to the internal electrodes, permittivity was high as compared to Comparative Example 3 in which the dielectric layers did not contain magnesium (Mg), and thus capacitance of the multilayer ceramic electronic component was increased. Further, it may be confirmed that the breakdown voltage was increased.

In addition, it may be appreciated that, in Inventive Example 2, the DC-bias characteristics were also excellent as compared to Comparative Example 3.

As set forth above, according to exemplary embodiments, a multilayer ceramic electronic component is provided having capacitance that is increased due to an increase in permittivity. A method of manufacturing the same is also provided.

Further, according to exemplary embodiments, a multilayer ceramic electronic component is provided having reliability that is improved due to excellent DC-bias characteristics, high breakdown voltage (BDV), and high insulation resistance (IR). A method of manufacturing the same is also provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body in which dielectric layers and internal electrodes are alternately stacked,
wherein the internal electrodes contain a ceramic component containing a grain growth adjusting ingredient for dielectric grains, and the dielectric layers each include interfacial portions adjacent to the internal electrodes and a central portion disposed between the interfacial portions, and
wherein a ratio of a number of the dielectric grains having a ratio of a long axis to a short axis that is 3.5 or more contained in a particular dielectric layer to a total number of the dielectric grains contained in the particular dielectric layer is 0.1% to 30%.

2. The multilayer ceramic electronic component of claim 1, wherein the internal electrodes contain the ceramic component trapped therein, and a cross-sectional area occupied by the ceramic component is 3% to 30% of the entire cross-sectional area of the internal electrodes.

3. The multilayer ceramic electronic component of claim 1, wherein a ratio (T2/T1) of a thickness T2 of dielectric grains present in the interfacial portions adjacent to the internal electrodes to a thickness T1 of the dielectric layer is 10 to 45%.

4. The multilayer ceramic electronic component of claim 1, wherein an average particle size of dielectric grains present in the central portion disposed between the interfacial portions is equal to or less than 85% of an average particle size of dielectric grains present in the interfacial portions.

5. The multilayer ceramic electronic component of claim 1, wherein a ratio (T2/T1) of a thickness T2 of dielectric grains present in the interfacial portions adjacent to the internal electrodes to a thickness T1 of the dielectric layer is 2% to 30%.

6. The multilayer ceramic electronic component of claim 1, wherein an average particle size of dielectric grains present in the interfacial portions is equal to or less than 85% of an average particle size of dielectric grains present in the central portion disposed between the interfacial portions.

7. The multilayer ceramic electronic component of claim 1, wherein the grain growth adjusting ingredient includes a grain growth promoter selected from the group consisting of Li, Bi, B, Na and K, and a grain growth inhibitor selected from the group consisting of Mg, Si, V, Yb, Y, Zr, and S.

8. A multilayer ceramic electronic component comprising:
a ceramic body in which dielectric layers and internal electrodes are alternately stacked,
wherein the internal electrodes contain a grain growth adjusting ingredient for dielectric grains, the grain growth adjusting ingredient including one of a grain growth promoter and a grain growth inhibitor, and
wherein a ratio of a number of the dielectric grains, having a ratio of a long axis to a short axis that is 3.5 or more contained in a particular dielectric layer, to a total number of the dielectric grains contained in the particular dielectric layer is 0.1% to 30%.

9. The multilayer ceramic electronic component of claim 8, wherein each dielectric layer includes interfacial portions adjacent to the internal electrodes and a central portion disposed between the interfacial portions, and a concentration of the grain growth promoter in the central portion is lower than that in the interfacial portions.

10. The multilayer ceramic electronic component of claim 9, wherein a ratio (T2/T1) of a thickness T2 of dielectric grains present in the interfacial portions adjacent to the internal electrodes to a thickness T1 of the dielectric layer is 10% to 45%.

11. The multilayer ceramic electronic component of claim 9, wherein an average particle size of dielectric grains present in the central portion disposed between the interfacial portions is equal to or less than 85% of an average particle size of dielectric grains present in the interfacial portions.

12. The multilayer ceramic electronic component of claim 8, wherein each dielectric layer includes interfacial portions adjacent to the internal electrodes and a central portion disposed between the interfacial portions, a concentration of the grain growth inhibitor in the central portion is higher than that in the interfacial portions, and a concentration of the grain growth promoter in the interfacial portions is higher than that in the central portion.

13. The multilayer ceramic electronic component of claim 8, wherein each dielectric layer includes interfacial portions adjacent to the internal electrodes and a central portion disposed between the interfacial portions, and a concentration of the grain growth inhibitor in the interfacial portions is higher than that in the central portion.

14. The multilayer ceramic electronic component of claim 13, wherein a ratio (T2/T1) of a thickness T2 of dielectric grains present in the interfacial portions adjacent to the internal electrodes to a thickness T1 of the dielectric layer is 2% to 30%.

15. The multilayer ceramic electronic component of claim 13, wherein an average particle size of dielectric grains present in the interfacial portions is equal to or less than 85% of an average particle size of dielectric grains present in the central portion disposed between the interfacial portions.

16. The multilayer ceramic electronic component of claim 8, wherein each dielectric layer includes interfacial portions adjacent to the internal electrodes and a central portion disposed between the interfacial portions, a concentration of the grain growth inhibitor in the interfacial portions is higher than that in the central portion, and a concentration of the grain growth promoter in the central portion is higher than that in the interfacial portions.

17. A multilayer ceramic electronic component comprising:
- a plurality of internal electrodes that are stacked parallel to each other; and
- a plurality of dielectric layers disposed between adjacent internal electrodes of the stacked internal electrodes,
- wherein the internal electrodes and dielectric layers are stacked along a thickness direction of the multilayer ceramic electronic component, and each respective dielectric layer includes a grain growth adjusting ingredient, which is one or more of a grain growth promoter and a grain growth inhibitor, and
- wherein a ratio of a number of the dielectric grains having a ratio of a long axis to a short axis that is 3.5 or more in a particular dielectric layer to a total number of the dielectric grains contained in the particular dielectric layer is 0.1% to 30%.

18. The multilayer ceramic electronic component of claim 17, wherein the grain growth adjusting ingredient includes one or more elements selected from the group consisting of Li, Bi, B, Na, K, Mg, Si, V, Yb, Y, Zr, and S.

19. The multilayer ceramic electronic component of claim 17, wherein the internal electrodes of the plurality of internal electrodes include the same grain growth adjusting ingredient as the dielectric layers.

20. The multilayer ceramic electronic component of claim 19, wherein the internal electrodes include a ceramic component that is doped with the same grain growth adjusting ingredient.

21. The multilayer ceramic electronic component of claim 17, wherein the concentration of the grain growth adjusting ingredient varies in the respective dielectric layer according to a distance to a nearest internal electrode, and the concentration of the grain growth adjusting ingredient is higher in the respective dielectric layer at locations nearer to the internal electrodes.

22. The multilayer ceramic electronic component of claim 17, wherein in at least one location, the dielectric layer includes only one to five dielectric grains in a thickness direction of the dielectric layer between two adjacent internal electrodes.

* * * * *